May 21, 1963 W. P. HILL 3,090,261
NUMERICALLY CONTROLLED BEAM FABRICATING MACHINE
Filed June 5, 1961 8 Sheets-Sheet 1
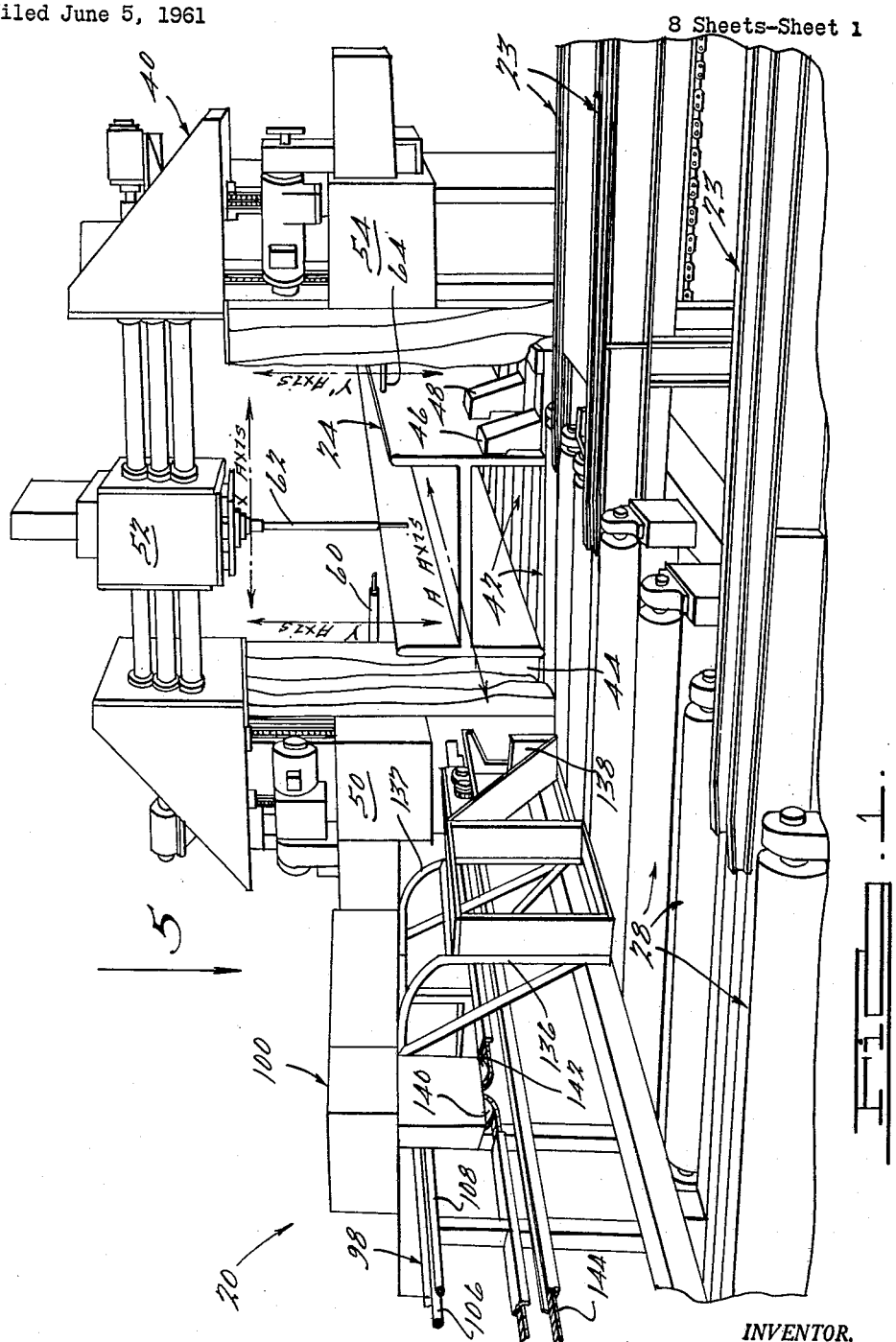
INVENTOR.
Walter P. Hill
BY
Harness, Dickey & Pierce
ATTORNEYS

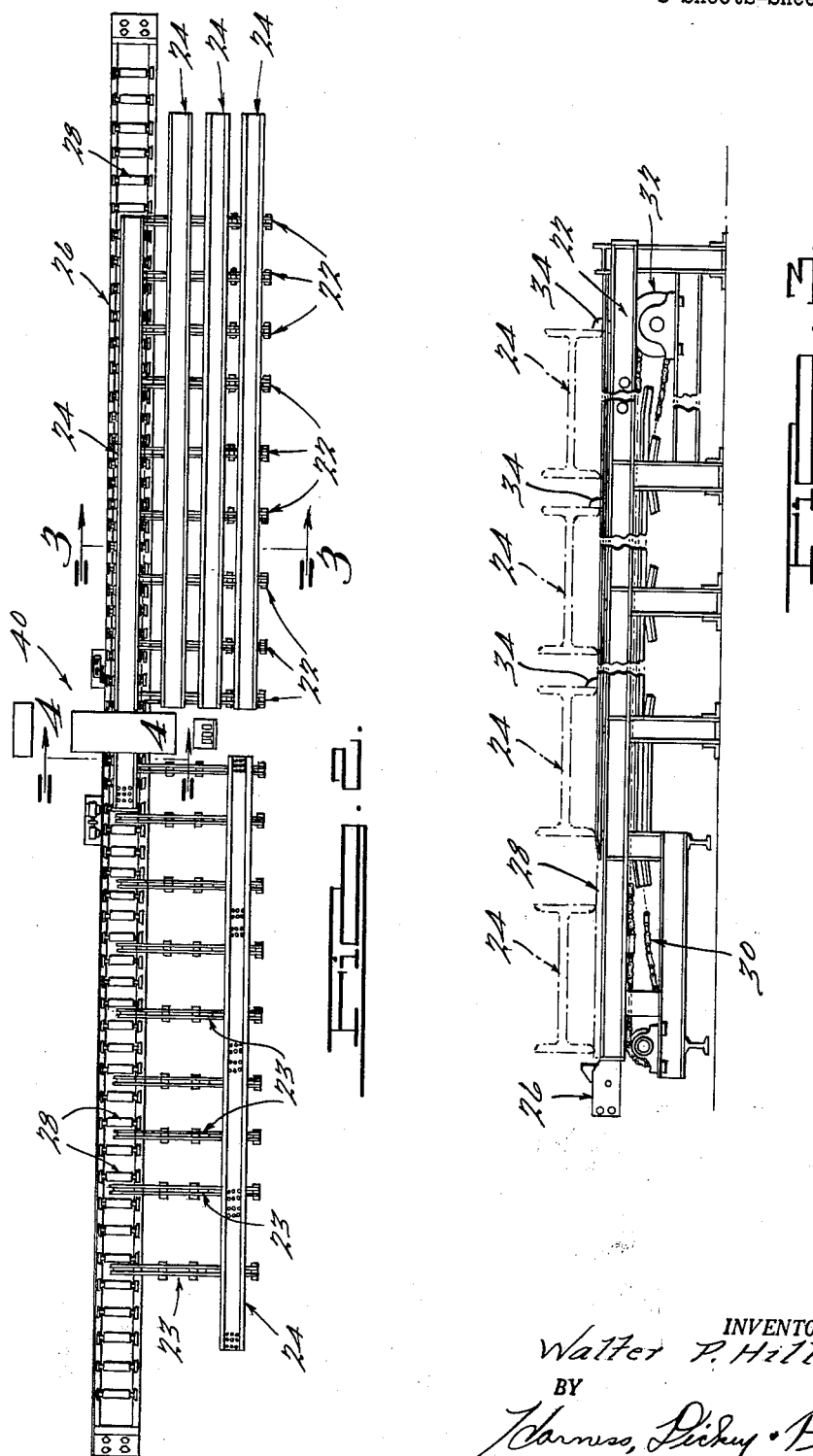

May 21, 1963 W. P. HILL 3,090,261
NUMERICALLY CONTROLLED BEAM FABRICATING MACHINE
Filed June 5, 1961 8 Sheets-Sheet 3
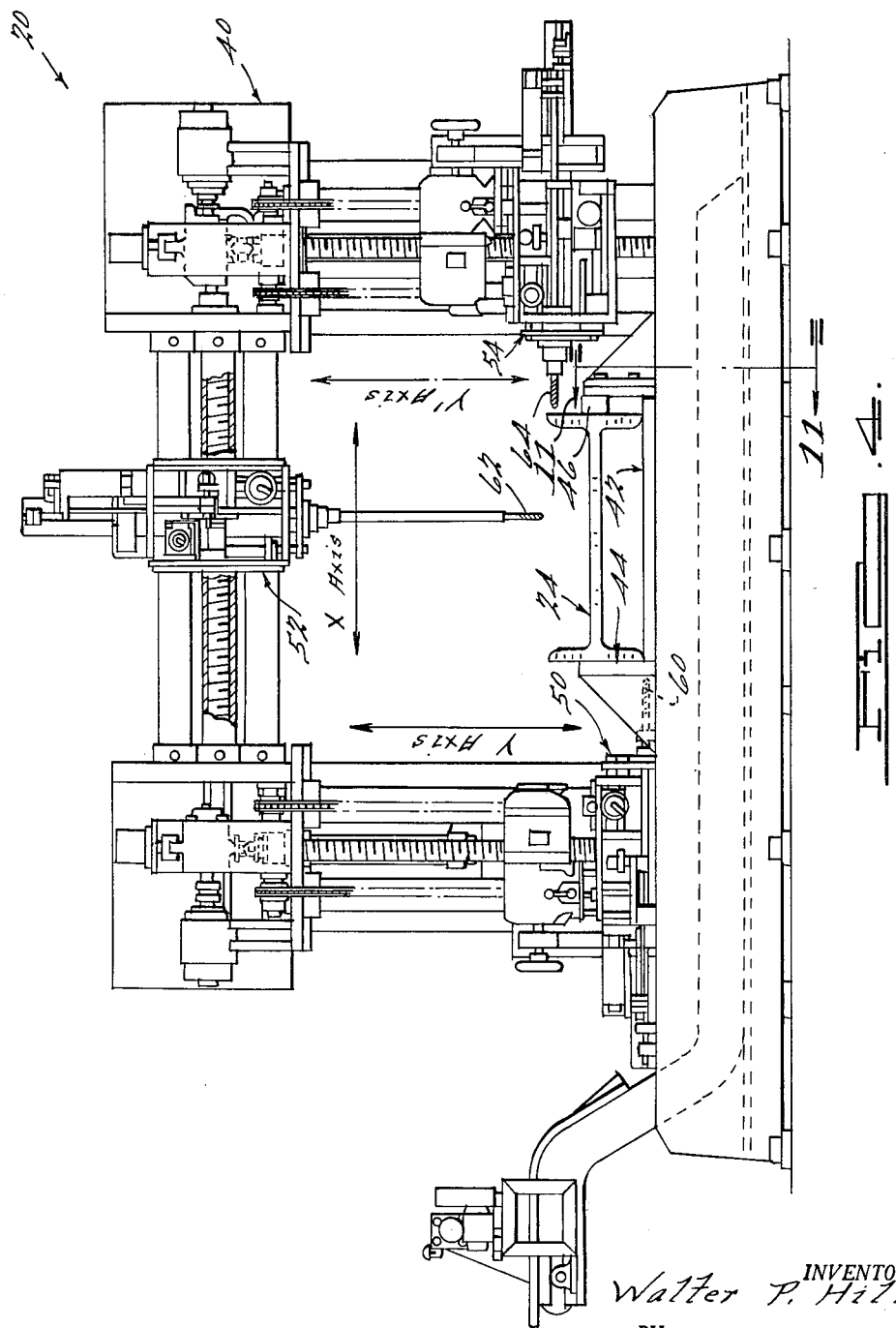
INVENTOR
Walter P. Hill
BY
Barnes, Dickey & Pierce
ATTORNEYS

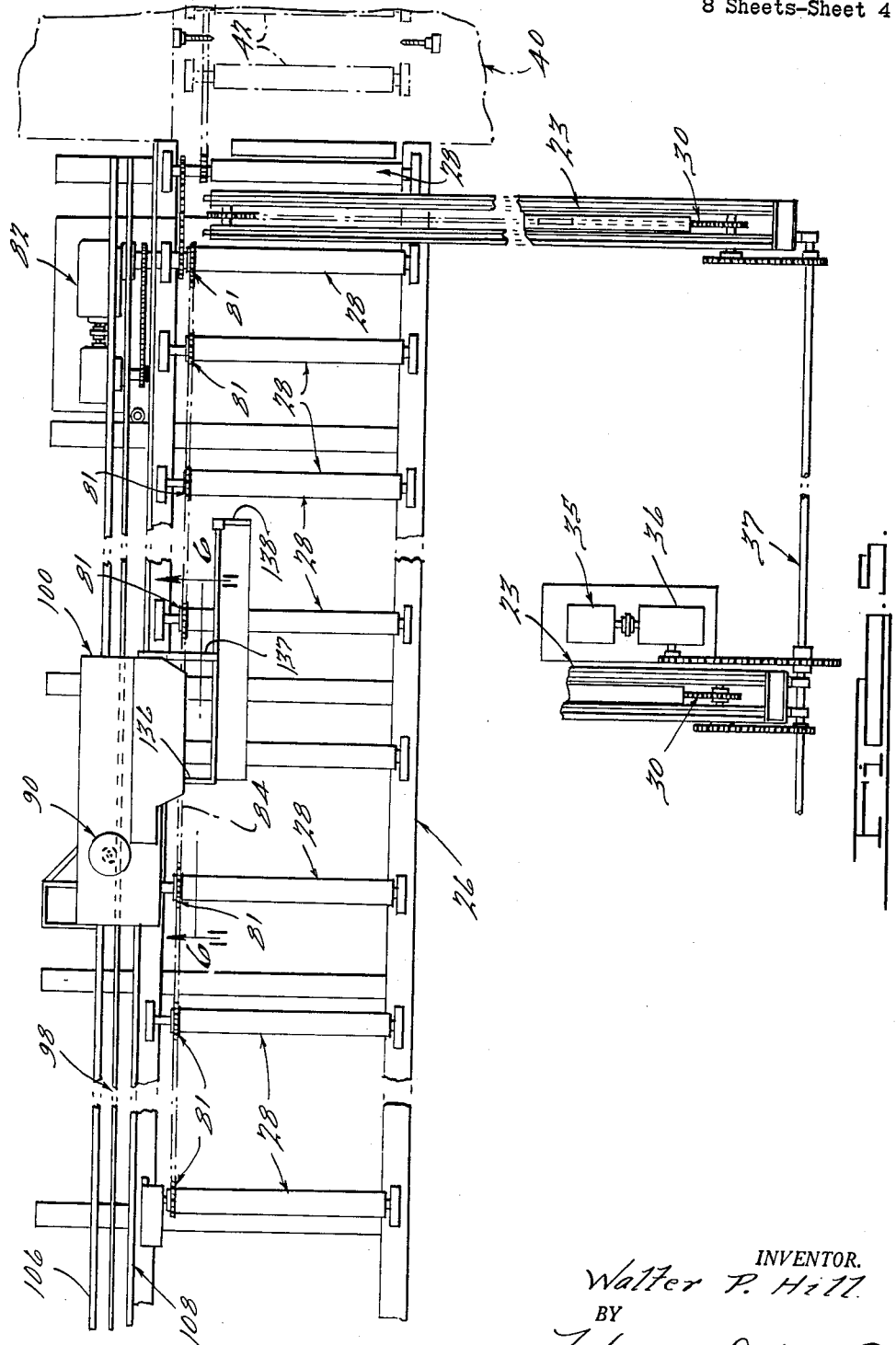

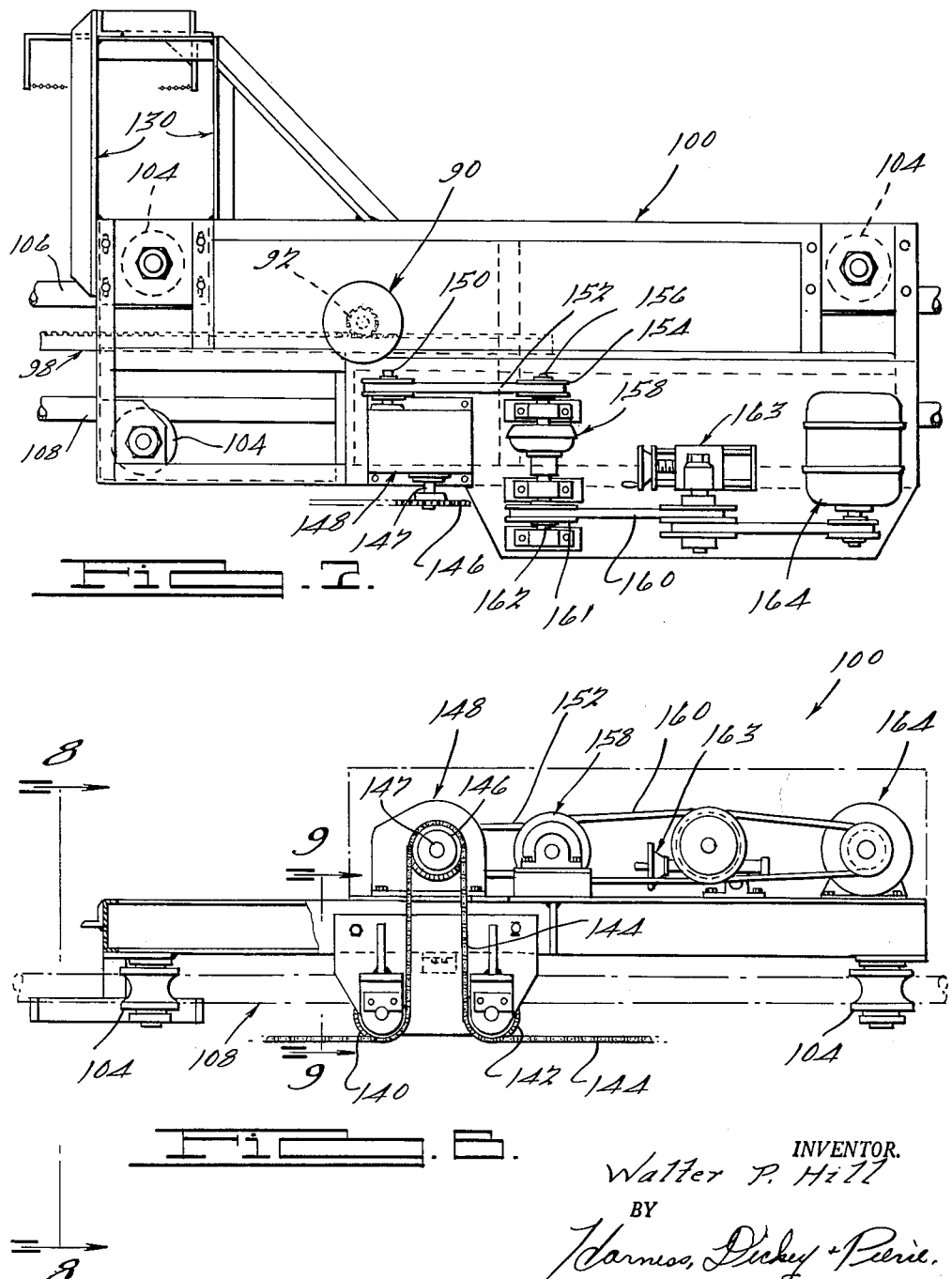

May 21, 1963 W. P. HILL 3,090,261
NUMERICALLY CONTROLLED BEAM FABRICATING MACHINE
Filed June 5, 1961 8 Sheets-Sheet 6
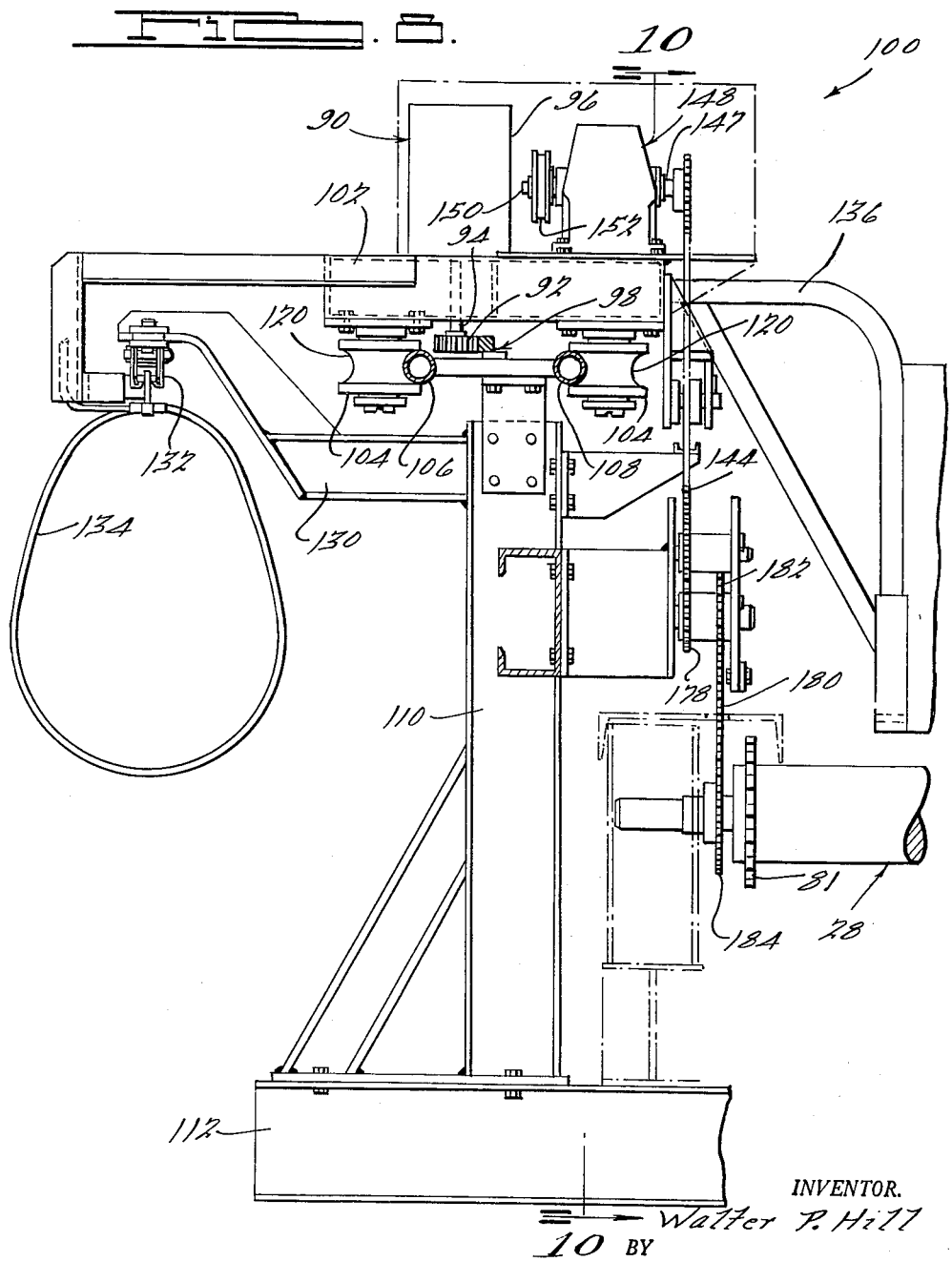
INVENTOR.
Walter P. Hill
BY
Harness, Dickey & Pierce,
ATTORNEYS.

May 21, 1963 W. P. HILL 3,090,261
NUMERICALLY CONTROLLED BEAM FABRICATING MACHINE
Filed June 5, 1961 8 Sheets-Sheet 7
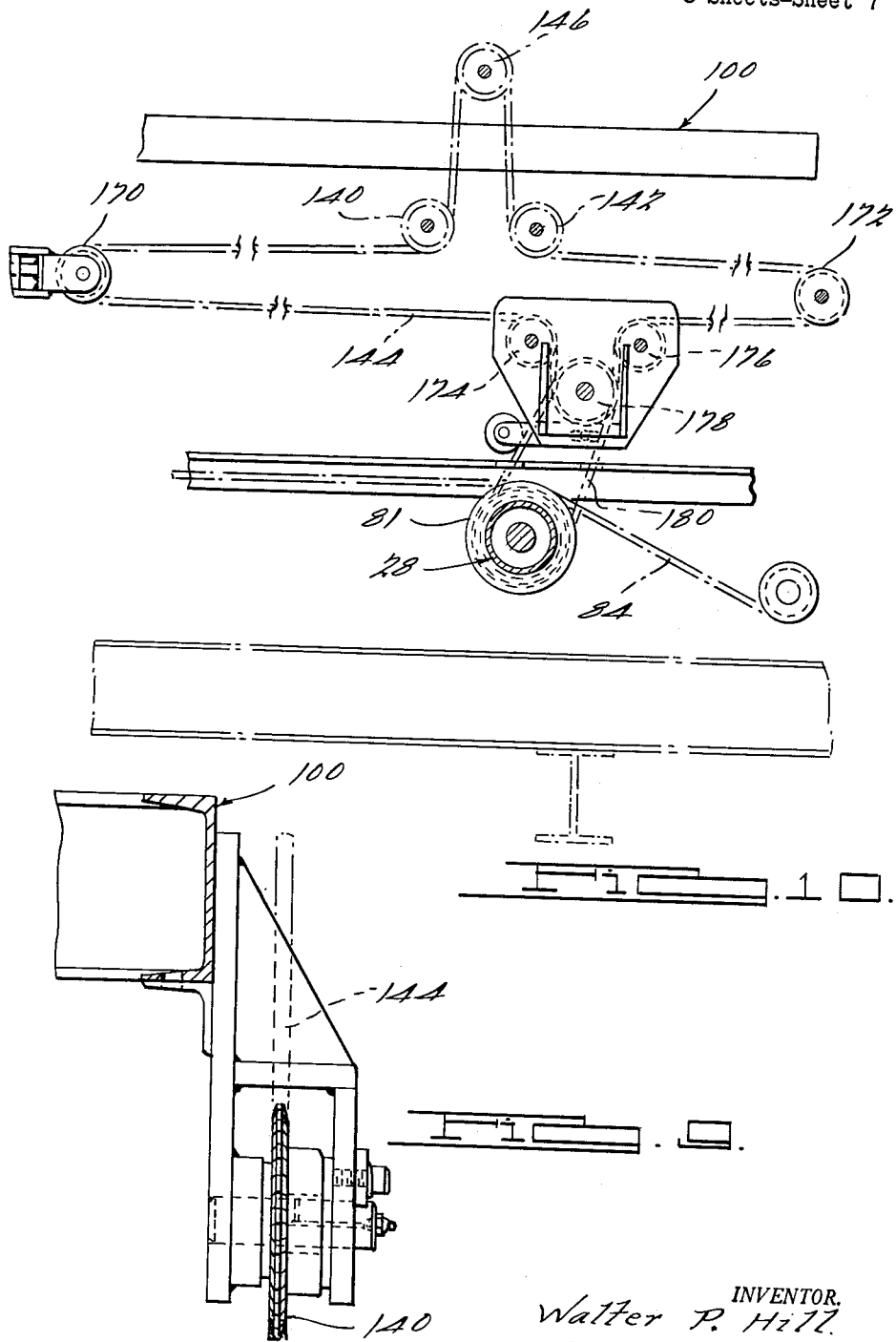
INVENTOR.
Walter P. Hill
BY
Harness, Dickey & Pierce
ATTORNEYS May 21, 1963 W. P. HILL 3,090,261
NUMERICALLY CONTROLLED BEAM FABRICATING MACHINE
Filed June 5, 1961 8 Sheets-Sheet 8
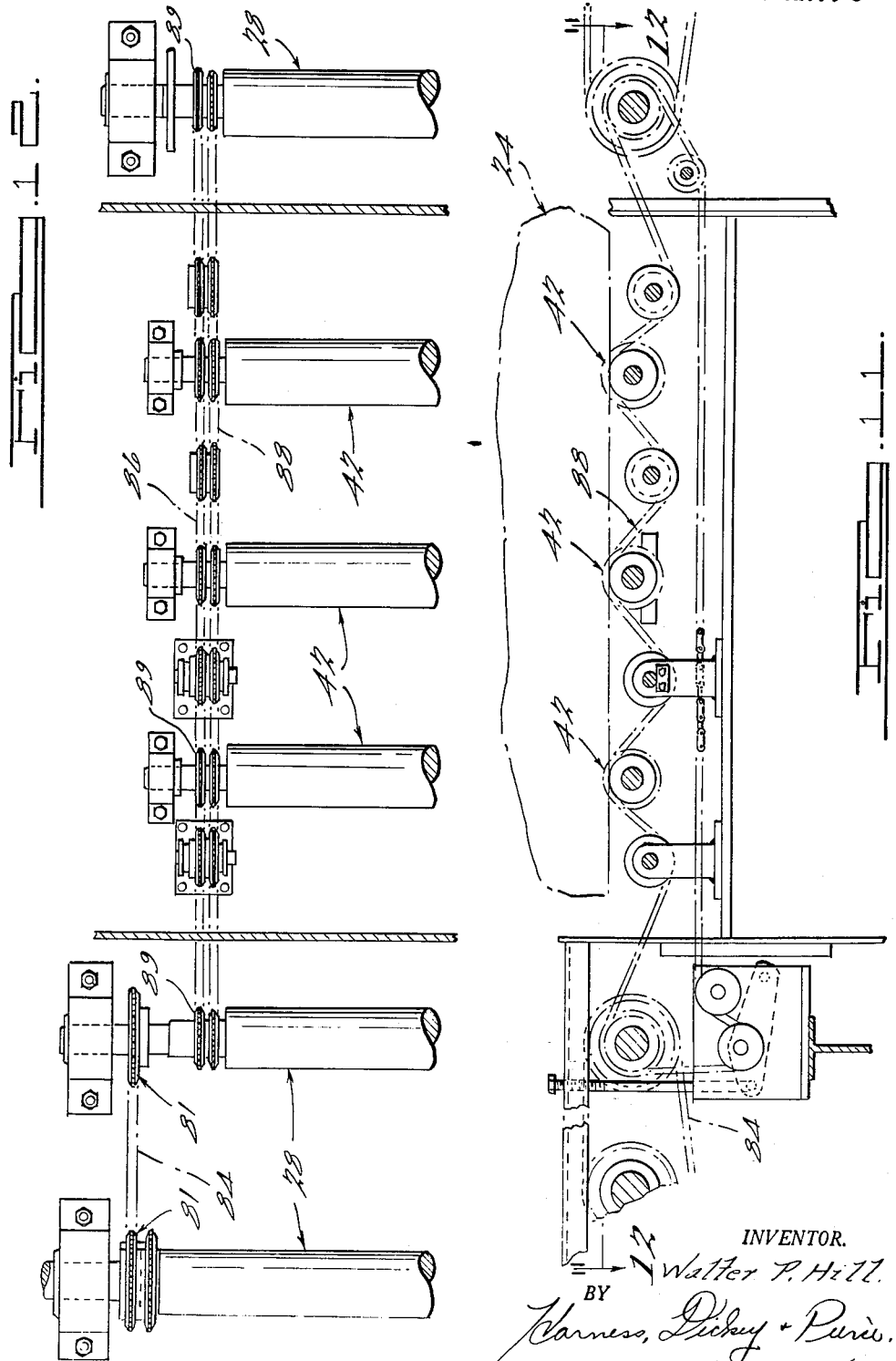
INVENTOR.
Walter P. Hill
BY
Harness, Dickey & Pierce
ATTORNEYS

United States Patent Office 3,090,261
Patented May 21, 1963

3,090,261
NUMERICALLY CONTROLLED BEAM FABRICATING MACHINE
Walter P. Hill, 22183 Telegraph Road, Detroit, Mich.
Filed June 5, 1961, Ser. No. 114,926
3 Claims. (Cl. 77—32.2)

This invention relates generally to numerically controlled machines and more particularly to a numerically controlled beam fabricating machine.

Numerical positioning control systems are applicable to any machine having a movable component that is positionable at a numerically definable point with respect to a fixed component thereof, for example, drilling machines having a movable table for the support of a workpiece, the table being movable with respect to a drill head so that holes can be drilled at successive positions on the workpiece. Such control systems comprise an intelligence input device, a position sensing system, means for correlating the input and position intelligence, and a prime mover for the movable component of the machine that is responsive to the correlating means. Whenever the movable component of the machine tool is in a position other than the position defined by the input intelligence, an error signal is transmitted from the position sensing system to the correlating means of the control system, which analyzes the error signal and energizes the prime mover in accordance therewith.

However, where a workpiece is of relatively large dimension, for example, a structural beam having, for example, a longitudinal dimension of 50 feet, a table for the support of such a workpiece would be prohibitively large and inherently difficult to accurately position.

A beam fabricating machine in accordance with the present invention solves this problem by eliminating the conventional movable component of the machine. In contradistinction, the beam fabricating machine of the instant invention supports the workpiece on a plurality of numerically controlled drive rolls which move the workpiece to a predetermined longitudinal position with respect to a work station as sensed by a novel position sensing system. The workpiece is maintained at a vertical index position as by its own weight and is biased to a horizontal index position by suitable clamping apparatus. The longitudinal position sensing system is biased into abutting engagement with the end of the workpiece and therefore is not required to be coupled to the workpiece in order to reflect the position thereof with respect to a work station.

Accordingly, one object of the present invention is an improved beam fabricating machine.

Another object is a beam fabricating machine wherein a beam is positionable at a predetermined position with respect to a work station without requiring a movable supporting table for the beam.

Another object is an improved positioning system for positioning a relatively long workpiece with respect to a tool.

Another object is a positioning system wherein the position sensing element is not required to be attached to the workpiece.

Other objects and advantages of the present invention will be apparent in the following specification, claims and drawings, wherein:

FIGURE 1 is a perspective view of the work station of a beam fabricating machine in accordance with the present invention;

FIG. 2 is a top view of the storage, feed and discharge rolls of the machine of FIGURE 1; with the longitudinal position sensing system removed for clarity;

FIG. 3 is a view taken along the line 3—3 of FIG. 2;

FIG. 4 is a view taken along the line 4—4 of FIG. 2;

FIG. 5 is a view taken in the direction of the arrow 5 of FIGURE 1;

FIG. 6 is a cross-sectional view taken substantially along the line 6—6 of FIG. 5;

FIG. 7 is a top view of the carriage of FIG. 6;

FIG. 8 is a cross-sectional view taken substantially along the line 8—8 of FIG. 6;

FIG. 9 is a cross-sectional view taken substantially along the line 9—9 of FIG. 6;

FIG. 10 is a diagrammatic cross-sectional view taken substantially along the line 10—10 of FIG. 8;

FIG. 11 is a cross-sectional view taken substantially along the line 11—11 of FIG. 4; and FIG. 12 is a view taken substantially along the line 12—12 of FIG. 11.

Referring to FIG. 2 of the drawings, a beam fabricating machine 20, in accordance with an exemplary embodiment of the present invention, comprises a plurality of storage and discharge rails 22 and 23, respectively, for the support of one or more structural beams 24. The beams 24 are movable laterally in translation along the rails 22 onto a feed and positioning conveyor 26 having a plurality of rolls 28 thereon to facilitate longitudinal advancement of the beams 24. After movement through the machine 20, the beams 24 are moved in translation along the rails 23 from the conveyor 26.

As best seen in FIG. 3, the beams 24 are moved in translation along the rails 22 by drive chains 30 that are driven as by a motor 32. Suitable dogs 34 on the chain 30 engage the beams 24 to effect movement thereof along the rails 22. As seen in FIG. 5, movement of the beams 24 along the rails 23 is accomplished by a similar drive chain 30 moving in the opposite direction. The chains 30 associated with the spaced rails 22 and 23 may be driven, if desired, by a single motor 35 through a speed reducer 36 and drive shaft 37.

As best seen in FIGURE 1, the beam 24 is advanced longitudinally of the conveyor 26 on the rolls 28 toward a work station generally designated by the numeral 40. The work station 40 comprises a plurality of rolls 42 that define a vertical datum or index plane for the beam 24. The beam 24 is held against the rollers 42, as well as against the rollers 28, by gravity.

A lateral index position for the beam 24 is defined by a stop 44, the beam 24 being biased thereagainst as by a pair of movable jaws 46 and 48. Thus, it will be seen that the beam 24 is movable through the work station 40 to a desired longitudinal position and thereafter positively positioned at predetermined vertical and horizontal index positions by the rollers 42 and stop 44.

The work station 40 is provided with a plurality of numerically controlled drill units 50, 52 and 54 which are movable along axes designated as X, Y and Y', respectively. The drill units 50, 52 and 54 are preferably positioned along the X, Y, and Y' axes under the control of a numerical positioning system as described in my copending application for: Positioning System, Serial No. 847,807, filed October 21, 1959. The drill units 50, 52 and 54 are provided with drills 60, 62 and 64, respectively, which are advanceable toward the beam 24 to drill holes therein at predetermined positions.

Movement of the beam 24 along the conveyor 26 on the rolls 28 and 42, or, in other words, along what is designated as an A axis of movement, is effected by driving the rolls 28 and 42 by a prime mover 82 (FIG. 5), for example, a servo motor. The rolls 28 are driven by a chain 84 (FIG. 12) that is engaged about complementary sprockets 81 on each of the rolls 28. The rolls 42 are driven by a pair of chains 86 and 88 that are engaged about suitable sprockets 89 on the rolls 28 and 42.

In accordance with the present invention, the position of the beam 24 along the A axis is sensed by a Selsyn system 90 (FIG. 10) mounted on a carriage 100 that, like the rolls 28 and beam 24, is driven longitudinally of the conveyor 26 by the chain 84.

The Selsyn system 90 comprises a gear 92 mounted on an input shaft 94. The shaft 94 extends upwardly into a housing 96 to effect rotation of the Selsyn in the conventional manner. The gear 92 is meshed with a rack 98 that extends along the conveyor 26 on the discharge side of the work station 40, as will be described.

The carriage 100, which supports the Selsyn system 90, comprises a frame 102 having four rectangularly orientated rolls 104 thereon that are rotatable about vertical axes and have arcuate peripheral sections 120, respectively, complementary to a pair of spaced parallel circular rails 106 and 108. The rails 106 and 108 are supported by a plurality of vertical stanchions 110 that are secured to transverse base members 112. The rolls 104, in combination with the rails 106 and 108, support the carriage 100 both vertically and laterally for movement longitudinally of the conveyor 26. The gear rack 98 is supported by the stanchions 110 between the rails 106 and 108. A plurality of arms 130 extend laterally from the stanchions 110 for the support of a conventional flexible power cord conveyor 132, a flexible conductor 134 being supported thereby to energize the electrical components of the carriage 100, as will be described, and to conduct signals from the Selsyn system 90 to the servo motor 82.

As best seen in FIGURE 1, a pair of arms 136 and 137 depend downwardly and laterally from the carriage 100 for the support of a beam-engaging plate 138. As best seen in FIGS. 6 and 7, the carriage 100 supports a pair of spaced sprockets 140 and 142 for engagement with a carriage drive chain 144. The carriage drive chain 144 extends upwardly and around a complementary sprocket 146 on an output shaft 147 of a speed reducer 148. An input shaft 150 of the speed reducer 148 is driven as by a belt 152 that extends about a pulley 154 on an output shaft 156 of a fluid coupling 158. The fluid coupling 158 is driven as by a belt 160 that extends about a pulley 161 on an input shaft 162 thereof. The belt 160 is driven through a variable speed coupling 163 by an electric motor 164.

As best seen in FIG. 10, the chain 144 extends about a pair of pulleys 170 and 172 at opposite ends of the discharge end of the conveyor 26, thence about a pair of sprockets 174 and 176 and about a drive sprocket 178. The sprocket 178 is driven by a chain 180 that extends about a sprocket 182 (FIG. 8) that is coaxially aligned and rotatable with the sprocket 178. The chain 180 extends about a sprocket 184 on the conveyor roll 28. The conveyor roll 28 has a sprocket 81 thereon for the acceptance of the drive chain 84, as discussed hereinbefore.

From the foregoing description, it should be apparent that the carriage drive chain 144 is driven at a rate directly related to the rate of movement of the roll drive chain 84. Therefore, if the sprocket 146 were to be locked and the chain 144 driven at the same rate as the chain 84, the carriage 100 would move along the rails 106 and 108 at the same speed at which the beam 24 moves. Thus, the position of the carriage 100 at any given time would reflect the position of the beam 24 supported on the rolls 28.

However, because of the difficulty inherent in accurately driving the carriage 100 and workpiece over the relatively large distances involved, when, for example, a beam 60 feet long is supported on the rolls 28, provision must be made to positively position the carriage 100 with respect to the end of the beam 24 in such a manner that the position of the beam 24 with respect to the work station 40 is positively and accurately reflected by the Selsyn system 90. This is accomplished by driving the carriage 100 toward the work station 40 by driving the sprocket 146 through the aforementioned speed reducer 148, fluid coupling 158 and variable speed coupling 163, by the motor 164. As best seen in FIG. 10, it will be appreciated that the net velocity of movement of the carriage 100 is the algebraic sum of the rotational velocities of the sprockets 178 and 146 which are driven by the roll drive chain 84 and motor 164, respectively. The motor 164 is energized and the variable speed coupling 163 is adjusted so that a bias, for example, of 100 lbs. is maintained by the plate 138 of the carriage 100 on the end of the workpiece 24.

The bias of the carriage 100 against the end portion of the beam 24 is adjustable by varying the setting of the coupling 163, slip in the fluid coupling 158 permitting the motor 164 to be continuously energized. Thus, the carriage 100 reflects the position of the beam 24 with respect to the work station 40 without being mechanically secured thereto. This cooperation between the carriage 100 and beam 24 accommodates variations in the rates of movement of the beam 24 and carriage 100 and inherent tolerance discrepancies in a mechanical movement of the length of the machine 20.

The sequence of operation of the machine 20 is initiated by energizing the drive chain 30 to move the beam 24 in translation laterally of the conveyor 26 along the rails 22. After the beam 24 is positioned on the rolls 28 of the conveyor 26, the prime mover 82 is energized to drive the rolls 28 to advance the beam 24 toward the work station 40. As the beam 24 advances under the work station 40, the end thereof engages the plate 138 on the carriage 100. The carriage 100 is positioned adjacent the work station 40 due to the continuous rotation of the sprocket 146 by the motor 164 which tends to continuously bias the carriage 100 relative to the drive chain 84. Thus, when the drive chain 84 and rolls 28 are stationary, the carriage 100 is moved toward the work station 40. At such time as the end of the beam 24 engages the carriage 100, the carriage 100 is moved with the beam 24 due to slippage in the fluid coupling 158. Further movement of the beam 24 through the work station 40 effects movement of the carriage 100, which movement effects rotation of the Selsyn 90 through engagement of the gear 92 thereof with the rack 98 underlying the carriage 100. At such time as the Selsyn 90 reflects that the carriage 100, and therefore the beam 24, is at a position dictated by suitable input intelligence to the servo motor 82, from, for example, a tape reader, the prime mover or servo motor 82 is deenergized. The drill units 50, 52 and 54 are then positioned along the Y, X, and Y' axes, respectively, and the drill heads 60, 62 and 64 thereof advance to bore holes in the beam 24. After this operation is completed, the beam 24 is advanced along the A axis to the next position dictated by the input intelligence as again reflected by the Selsyn system 90. Thus, the position of the beam 24 along the A axis is reflected at all times by the Selsyn 90.

It is to be understood that the specific construction of the improved numerically controlled beam fabricating machine herein disclosed and described is presented for the purpose of explanation and illustration and is not intended to indicate limits of the invention, the scope of which is defined by the following claims.

What is claimed is:

1. A numerically controlled beam fabricating machine comprising a plurality of rolls for the support of the beam, a work station, a numerically controlled prime mover for driving said rolls to effect movement of the beam with respect to the work station, a movable carriage driven by said numerically controlled prime mover so as to be movable at substantially the same rate as the beam, a second prime mover for driving said carriage in the opposite direction to said numerically controlled prime mover, a fluid coupling interposed between said prime movers, means for varying the effective force on said carriage, and means on said carriage for sensing the position thereof with respect to said work station.

2. A machine for effecting work on an elongated workpiece, said machine comprising a plurality of rolls for the support of the workpiece, a work station including a tool movable into engagement with the workpiece, a prime mover for driving said rolls to effect movement of the workpiece with respect to the work station, a movable carriage drivable by said prime mover in the direction of movement of said workpiece, a second prime mover for driving said carriage in the opposite direction to the direction of movement of said workpiece, means coupling said prime movers for maintaining a selected bias of said carriage against said workpiece, and means on said carriage for sensing the position of the workpiece with respect to said work station and controlling said first mentioned prime mover.

3. In a machine for drilling holes at predetermined positions in an elongated beam, the improvement comprising a plurality of rolls for the support of the beam, a work station including a tool movable into engagement with the workpiece, a prime mover for driving said rolls to effect movement of the beam with respect to the work station, a movable carriage drivable by said prime mover in the direction of movement of said beam, a second prime mover for driving said carriage in the opposite direction to the direction of movement of said beam, a fluid coupling interposed between said prime movers having an output torque for biasing said carriage against said beam with a predetermined force, and means on said carriage for sensing the position of the workpiece with respect to said work station and controlling said first mentioned prime mover.

References Cited in the file of this patent
UNITED STATES PATENTS 1,241,258    Hawthorne _____ Sept. 25, 1917

FOREIGN PATENTS 623,252    Germany _____ Dec. 18, 1935